United States Patent [19]

Freeguard

[11] 4,257,925

[45] Mar. 24, 1981

[54] PLASTICS MATERIAL INCORPORATING RECLAIMED TIRE RUBBER

[76] Inventor: Graham F. Freeguard, 16, Church Dr., Keyworth, Nottinghamshire, England

[21] Appl. No.: 43,947

[22] Filed: May 30, 1979

[30] Foreign Application Priority Data

May 31, 1978 [GB] United Kingdom ............... 25509/78

[51] Int. Cl.³ .......................................... B29H 19/00
[52] U.S. Cl. ...................... 260/2.3; 204/30; 525/285; 525/288; 525/315; 525/316
[58] Field of Search ................ 260/2.3; 525/285, 288, 525/315, 316

[56] References Cited

U.S. PATENT DOCUMENTS

| | | | |
|---|---|---|---|
| 2,853,742 | 9/1958 | Dasher | 260/2.3 |
| 3,042,634 | 7/1962 | Mankowich et al. | 260/2.3 |

*Primary Examiner*—J. Ziegler
*Attorney, Agent, or Firm*—E. Eugene Innis; Thomas G. Ryder

[57] ABSTRACT

Large quantities of reclaimed tire rubber can be incorporated into plastics material without seriously impairing its impact strength by a method which comprises the steps of swelling the reclaimed tire rubber with a quantity of monomer which is insufficient to saturate the reclaimed tire rubber and polymerizing the swollen mass.

The method is effective despite the multiplicity of additives such as extenders, antioxidants and lubricants present in the reclaimed tire rubber.

The preferred monomer is styrene.

In certain cases the plastics material can be electroplated after suitable chemical treatment.

9 Claims, 1 Drawing Figure

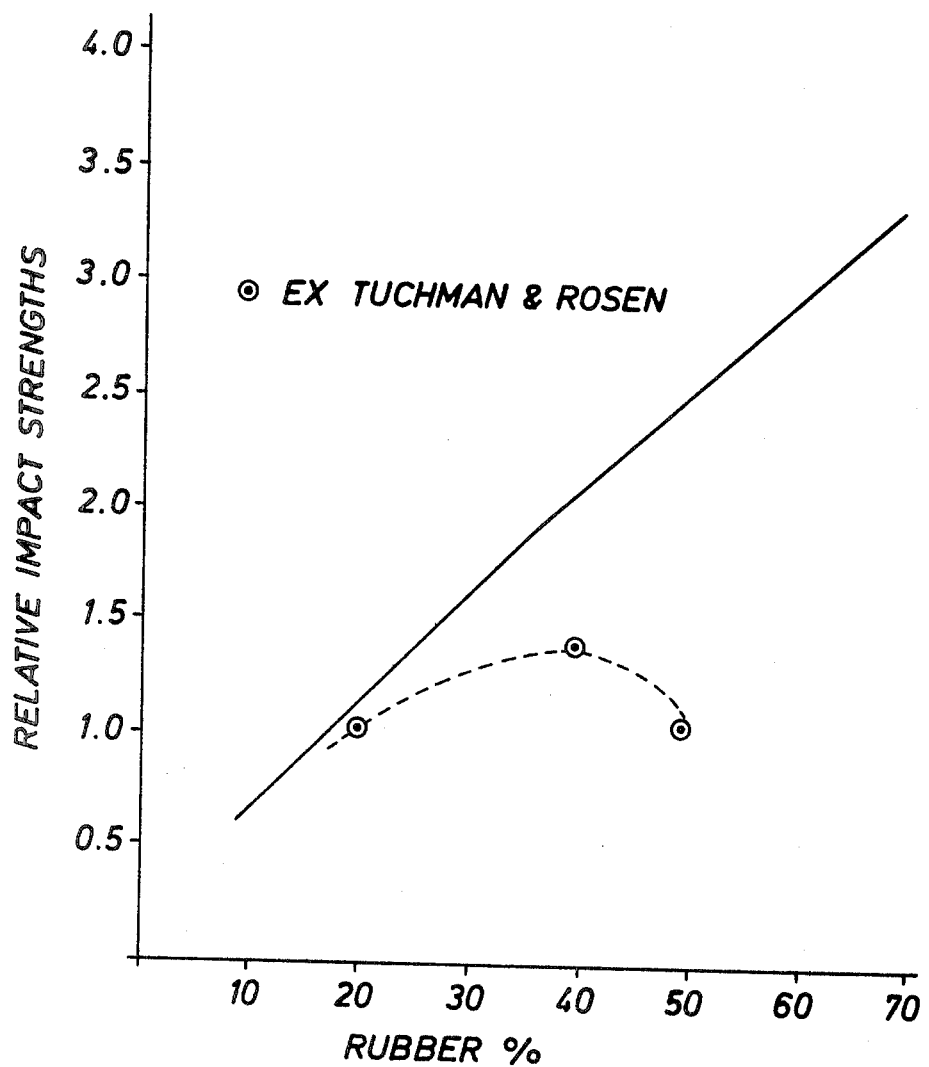

PLASTICS MATERIAL INCORPORATING RECLAIMED TIRE RUBBER

This invention relates to a method of making plastics material incorporating reclaimed tyre rubber and to plastics material when made by said method.

During the past decade considerable research has been carried out to discover uses for reclaimed tyre rubber.

In October 1977 Tuchman and Rosen presented a paper at the 112th meeting of the Rubber division of the American Chemical Society in which, inter alia, they examined the properties of plastics materials formed by moulding mechanical blends containing up to 60% by weight of cryogenically ground tyre rubber with various polymers including polypropylene and polystyrene. They discovered that the impact strength of such plastics materials increased steadily until the reclaimed rubber constituted about 40% of the weight of the plastics materials. As the reclaimed rubber loadings increased above this level the impact strength decreased.

In order to prevent this decrease in impact strength Tuchman and Rosen tried pre-treating the cryogenically ground tyre rubber before mechanically blending it with polystyrene.

One such pre-treatment included removing the major additions (i.e. stabilisers, antioxidants, lubricants and extending oils) from the cryogenically ground tyre rubber, swelling the cryogenically ground tyre rubber in excess styrene, polymerizing the styrene, and extracting any unpolymerized styrene with benzene. Tuchman and Rosen discovered that the resulting graft polymer (which contained greater than 85% by weight styrene) was excessively cross-linked and was not suitable as an impact enhancer when blended with polystyrene. They concluded that future work should be aimed at treating only the surface of the rubber particles and suggested a technique which they felt was unlikely to work unless the stabilisers were removed from the tyre rubber.

Unfortunately, the pre-treatment suggested by Tuchman and Rosen was expensive and industry was left with the problem of how to utilise substantial quantities of reclaimed rubber in plastics material economically and without suffering loss in impact strength at reclaimed rubber loadings in excess of 40% by weight.

According to the present invention there is provided a method of making plastics material which comprises swelling reclaimed tyre rubber with a quantity of monomer which is insufficient to saturate said reclaimed tyre rubber and polymerizing the swollen mass.

It is particularly surprising that, at least in the preferred embodiments, ground tyre rubber can be used without any previous treatment to remove the plurality of additives normally incorporated therein.

The monomer is conveniently a vinyl aromatic compound, for example styrene, substituted styrenes, for example beta-bromostyrene, chlorostyrene; acrylonitile; divinyl benzene, and mixtures thereof.

Preferably, the swollen mass comprises (by weight) between 18% and 90% reclaimed tyre rubber with 25 to 70% being more preferred. In this connection we have found that moulded plastics materials containing up to 50% reclaimed tyre rubber have a very acceptable surface finish even without the use of the normal mould release agents. It should also be noted that the quality of the surface is, to a surprising extent, independent of the size of the reclaimed tyre rubber used although we prefer to use ground reclaimed tyre rubber particles having an average size of between 5 and 3,000 microns with 100 to 1,000 microns being preferred and between 100 and 500 microns being recommended.

Polymerization can be initiated thermally or, conveniently, by a free radical initiator such as benzoyl peroxide which can conveniently be pre-mixed with the monomer.

The polymerization may be carried out as a simple mass polymerization or as a suspension polymerization when for example the blend of reclaimed tyre rubber and monomer is stirred or otherwise agitated with an aqueous phase so as to produce a suspension of the pre or partially polymerized mass.

We have found that where the particles are sufficiently small the monomer is absorbed very rapidly and swelling is complete after about 30 minutes. However, it is envisaged that there may be circumstances in which the monomer would not be easily absorbed and for such cases we recommend that the monomer should be dissolved in an inert solvent to facilitate the absorption.

Once the plastics material is formed, any unreacted monomer and volatiles can be removed if desired.

Additives such as lubricants, anti-oxidants and pigments may also be added to the swollen reclaimed rubber if desired. In addition, chain transfer agents may be added to increase or decrease the molecular weight as desired. Typically mercaptans would be used for lowering the molecular weight and divinyl compounds to increase it.

Our discovery seems even more surprising when it is considered that the impact strength of a plastics material formed by swelling artificially cross-linked polybutadine with styrene monomer and polymerizing the swollen mass decreased from 5.06 ft lb/in to 4.90 ft lb/in as the rubber content increased from 14.4% to 31.2% (see Polymer Engineering and Science, Vol. 12, March 1972).

For a better understanding of the invention reference will now be made to the following non-limiting Examples.

In each Example benzoyl peroxide initiator was dissolved in styrene monomer. The mixture was then sprayed onto a layer of crogenically ground tyre rubber having an average particle size of 200 microns. (The spraying technique was found to give more homogenous mixing than simply pouring). The mixture was then placed in a glass jar and maintained under an inert atmosphere of nitrogen overnight during which time the tyre rubber adsorbed all the available styrene monomer. The temperature was then raised in increments to 150° C. over a period of 36 hours and held at this temperature for a further 8 hours after which only small quantities of monomer remained. The jars were then smashed and the plastic material removed, granulated and injection moulded into standard test pieces. The mechanical properties of representative test pieces were then measured.

An extract of the formulations tested and their notched impact strength and other properties are listed in Table 1. The notched impact strengths compared with glassy polystyrene are shown in Figure upon which we have also superimposed a chain dotted line which illustrates the relative impact strengths obtained by Tuchman and Rosen when examining their mechanical blends. It is clear from the figure that the impact strength of the plastics material made in accordance with the present invention increases rapidly as the loading of reclaimed rubber exceeds 40%. This is in complete contrast to the mechanical blends.

| | POWDER RECLAIMED TYRE RUBBER/ STYRENE POLYMER PROPERTIES | | | | |
|---|---|---|---|---|---|
| | Composition | | Impact Strength | Tensile | % |
| Batch No. | Rubber (Wt. %) | Catalyst (Wt. %) | ft lb/inch² (Notched) | Strength (PSI) | Elongation |
| 2 | 50 | .5 | 3.9 | 980 | 19.1 |
| 3 | 65 | .5 | 6.7 | 280 | 47.0 |
| 4 | 33 | .5 | 4.3 | 2050 | 9.2 |
| 5 | 50 | .5 | 4.4 | 870 | 42.5 |
| 33 | 30 | .5 | 2.4 | 2010 | 7.7 |
| 35 | 50 | .5 | 4.5 | 1330 | 15.3 |

A number of the remaining test pieces were then degreased in a mild alkaline cleaner for ten minutes at 45° to 50° C. then washed twice with deionised water and dried. The test pieces were then placed in chromic acid at 60° C. and left there for twelve minutes. The test pieces were then removed and washed thoroughly with deionised water. Stannous ions were then absorbed on the sensitised surface by immersing the test pieces in 0.05 M Stannous chloride in 0.5 M hydrochloric acid solution at 20° C. for five minutes. The test pieces were then rinsed thoroughly, immersed in a solution containing 0.002 M palladium dichloride in 0.1 M hydrochloric acid at 20° C. for five minutes. The test pieces were then rinsed thoroughly and immersed in a bath comprising a mixture of copper sulphate, sodium hydroxide, formaldehyde and sodium potassium tartrate.

The test pieces were then examined and found to have a firm, electrically conductive coating upon which further metal depositions could be made by electroplating.

Various modifications may be made to the process described, for example a mixture of two monomers may be used in place of the single monomer. Thus, a mixture of styrene and acrylonitrile could be used. Advantageously the amount of acrylonitrile in such a system should be between 0.2 and 0.8 parts by weight per part by weight of styrene. In this connection we would strongly recommend using acrylonitrile in the azeotropic range of 0.31 parts by weight acrylonitrile per part by weight of styrene.

Whilst the process described above utilized liquid monomer it should be appreciated that the reclaimed rubber could be exposed to monomer in the vapour phase.

After the primary tests outlined above had been completed further tests were carried out to observe the effect of increasing the average particle size of the reclaimed rubber. It was discovered that whilst impact strengths generally increased with average particle size the time taken for the monomer to soak into the reclaimed rubber particles increased rapidly. For overall properties we would recommend that the reclaimed rubber has an average size of 200 to 500 microns prior to swelling.

If desired the reclaimed tyre rubber could be pretreated by solvent extraction. This however appears unnecessary.

What is claimed is:

1. A method of making plastics material which method is characterized in that it comprises swelling reclaimed tyre rubber which has been reduced to an average particle size of between 5 and 3,000 microns by contacting with a quantity of monomer which is insufficient to saturate said reclaimed tyre rubber for a period time of less than about 30 minutes and polymerizing the swollen mass.

2. A method according to claim 1, characterized in that said reclaimed rubber comprises between 18% and 90% of the weight of said swollen mass.

3. A method according to claim 2, characterized in that said reclaimed rubber comprises between 25 and 70% of the weight of said swollen mass.

4. A method according to claim 3, characterized in that said reclaimed rubber comprises between 25 and 50% of the weight of said swollen mass.

5. A method according to claim 1, characterized in that prior to swelling said reclaimed rubber has an average particle size of between 200 and 1,000 microns.

6. A method according to claim 5, characterized in that prior to swelling said reclaimed rubber has an average particle size of between 200 and 500 microns.

7. A method according to claim 1, characterized in that said monomer comprises a vinyl aromatic compound.

8. A method according to claim 7, characterized in that said monomer is styrene.

9. A method according to claim 1, characterized in that said monomer is liquid and is sprayed onto said reclaimed rubber.

* * * * *